(12) United States Patent
Huang et al.

(10) Patent No.: US 9,734,867 B2
(45) Date of Patent: Aug. 15, 2017

(54) MEDIA PROCESSING DEVICES FOR DETECTING AND RANKING INSERTION POINTS IN MEDIA, AND METHODS THEREOF

(75) Inventors: Yu Huang, Bridgewater, NJ (US); Chao Zhang, Beijing (CN); Hong Heather Yu, West Windsor, NJ (US); Dongjing Shan, Beijing (CN)

(73) Assignee: Futurewei Technologies, Inc., Plano, TX (US)

(*) Notice: Subject to any disclaimer, the term of this patent is extended or adjusted under 35 U.S.C. 154(b) by 628 days.

(21) Appl. No.: 13/069,136

(22) Filed: Mar. 22, 2011

(65) Prior Publication Data

US 2012/0242900 A1     Sep. 27, 2012

(51) Int. Cl.
| | | |
|---|---|---|
| H04N 7/10 | (2006.01) | |
| G11B 27/031 | (2006.01) | |
| G11B 27/28 | (2006.01) | |
| H04N 21/233 | (2011.01) | |
| H04N 21/234 | (2011.01) | |
| H04N 21/845 | (2011.01) | |

(52) U.S. Cl.
CPC ............ G11B 27/031 (2013.01); G11B 27/28 (2013.01); H04N 21/233 (2013.01); H04N 21/23418 (2013.01); H04N 21/23424 (2013.01); H04N 21/8455 (2013.01); H04N 21/8456 (2013.01)

(58) Field of Classification Search
None
See application file for complete search history.

(56) References Cited

U.S. PATENT DOCUMENTS

| | | | |
|---|---|---|---|
| 6,724,933 B1* | 4/2004 | Lin | ................... G06K 9/00711 |
| | | | 345/591 |
| 8,207,989 B2* | 6/2012 | Mei et al. | ..................... 345/629 |
| 2004/0125877 A1* | 7/2004 | Chang | ............... G06F 17/30787 |
| | | | 375/240.28 |
| 2007/0055986 A1* | 3/2007 | Gilley et al. | .................... 725/34 |
| 2007/0101269 A1* | 5/2007 | Hua | .................. G06F 17/30811 |
| | | | 715/723 |

(Continued)

OTHER PUBLICATIONS

Ma, Y-F., et al., "A User Attention Model for Video Summarization," ACM, Dec. 2002, 10 pages.*

(Continued)

*Primary Examiner* — Jason K Lin
(74) *Attorney, Agent, or Firm* — Slater Matsil, LLP

(57) ABSTRACT

In accordance with an embodiment of the present invention, a method for inserting secondary content into a media stream includes dividing the media stream having a plurality of frames into a plurality of shots at a processor. The method further includes grouping consecutive shots from the plurality of shots into a plurality of scenes. A first list of insertion points is generated for introducing the secondary content. The insertion points of the first list are boundaries between consecutive scenes in the plurality of scenes. An average insertion point saliency of the media stream is generated at the insertion points in the first list. A second list of insertion points is then generated. The insertion points in the second list are arranged to maximize a function of the average insertion point saliency and a distance between each insertion point in the second list with other insertion points in the second list.

20 Claims, 10 Drawing Sheets

(56) References Cited

U.S. PATENT DOCUMENTS

2009/0079871 A1* 3/2009 Hua et al. ............... 348/584
2009/0228920 A1* 9/2009 Tom et al. ............... 725/35
2010/0199300 A1* 8/2010 Meur et al. ............... 725/32
2012/0123780 A1* 5/2012 Gao ............... G06K 9/00751
                                                     704/245

OTHER PUBLICATIONS

Mei, T., et al., "VideoSense—Towards Effective Online Video Advertising," ACM, Sep. 23-28, 2007, 10 pages.*
Yueng, Minverva M. et al., "Video Visualization for Compact Presentaiton and Fast Browsinng of Pictorial Content," IEEE, Oct. 1997, 15 pages.*
Fischler, M.A., et al., "Random Sample Consensus: A Paradigm for Model Fitting with Applications to Image Analysis and Automated Cartography," Communications of the ACM, Jun. 1981, vol. 24, No. 6, pp. 381-395.
Li, H., et al., "Measuring the Intrusiveness of Advertisements: Scale Development and Validation," The Journal of Advertising, 2002, vol. XXXI, No. 2, pp. 37-47.
Liao, W-S., et al., "AdImage: Video Advertising by Image Matching and Ad Scheduling Optimization," ACM, Jul. 20-24, 2008, pp. 767-768.
Mei, T., et al., "VideoSense-Towards Effective Online Video Advertising," ACM, Sep. 23-28, 2007, 10 pages.
Shi, J., et al., "Good Features to Track," IEEE Conference on Computer Vision and Pattern Recognition, Jun. 1994, 8 pages.
Wang, J., et al. "Online Video Advertising Based on User's Attention Relavancy Computing," IEEE, 2008, pp. 1161-1164.
Yeung, M. M., et al., "Video Visualization for Compact Presentation and Fast Browsing of Pictorial Content," IEEE Transactions on Circuits and Systems for Video Technology, Oct. 1997, vol. 7, No. 5, pp. 771-785.

* cited by examiner

MEDIA PROCESSING DEVICES FOR DETECTING AND RANKING INSERTION POINTS IN MEDIA, AND METHODS THEREOF

TECHNICAL FIELD

The present invention relates generally to processing media content, and more particularly to media processing devices for detecting and ranking insertion points in media, and methods thereof.

BACKGROUND

Advertisements or ads are introduced within media and in many applications are independent from the content of the media stream. Ads may be contextual (content-targeted) and/or user-targeted advertising.

Typically, ads may be inserted into the media stream either before or during media streaming. Dynamic and/or automated insertion of ads into a media stream may be very difficult because this requires automatically selecting points within a continuous media stream for inserting the ads. Detecting appropriate insertion points for ads within a media stream is a serious challenge as inappropriate placement of ads can severely degrade user experience.

FIG. 1, which includes FIGS. 1A and 1B, illustrates a prior art hierarchical structure of media content.

A media stream 5 may comprise a plurality of frames 7 (FIG. 1B) that are presented to the viewer's eye in rapid succession to create the impression of movement. Each frame 7 may comprise pixels and the data may be present as binary data. Each frame 7 within a media stream 5 may be uniquely identified by its frame index, a serial number.

Media content may be classified as a plurality of scenes, such as scene(n), scene(n+1), scene(n+2) etc., thereby depicting sequentially a series of media events or stories. A scene is a collection of semantically and temporally related media content conveying a concept or story.

A scene may be comprised of a plurality of shots 6. A shot 6 is a unit of media production and may include a plurality of frames 7. For example, a shot may be an uninterrupted clip recorded by a single opening of a camera. The shot 6 may not be sufficiently long to depict a single media event, e.g., a story. Rather, a series of shots or a scene may be needed to depict a single media event or story.

SUMMARY OF THE INVENTION

In accordance with an embodiment of the present invention, a method for inserting secondary content into a media stream having primary content comprises dividing the media stream comprising a plurality of frames into a plurality of shots at a processor. The method further includes grouping consecutive shots from the plurality of shots into a plurality of scenes. A first list of insertion points is generated for introducing the secondary content. The insertion points of the first list are boundaries between consecutive scenes in the plurality of scenes. An average insertion point saliency of the media stream is generated at the insertion points in the first list. A second list of insertion points is generated. The insertion points are arranged in the second list to maximize a function of the average insertion point saliency and a distance between each insertion point in the second list with other insertion points in the second list.

In accordance with an alternative embodiment of the present invention, a method of introducing secondary content into a media stream comprises dividing the media stream comprising a plurality of frames into a plurality of shots at a processor. Consecutive shots from the plurality of shots are grouped into a plurality of scenes. A first list of insertion points is generated for introducing the secondary content. The insertion points of the first list are boundaries between consecutive scenes in the plurality of scenes. The method further includes generating an insertion point saliency of the media stream at the insertion points in the first list, and computing a distance between insertion points for all insertion points from the first list. A first function is computed for each insertion point in the first list. The first function is a sum of the insertion point saliency-weighted distance of the insertion point in the first list with other insertion points in the first list. A first insertion point is selected from the first list having the highest value of the first function as the first insertion point of a second list.

In accordance with an alternative embodiment of the present invention, a method for inserting secondary content into a media stream having primary content comprises dividing the media stream having a plurality of frames into a plurality of shots. A first list of insertion points is generated for introducing the secondary content. An attractiveness metric is computed for the media stream at the insertion points in the first list. A discontinuity metric is computed for the media stream at the insertion points in the first list. Next, a second list of insertion points is generated. The insertion points are arranged in the second list to maximize a function of the attractiveness metric and the discontinuity metric.

In accordance with an alternative embodiment of the present invention, a media processing unit comprises a shot detector, a scene transition analyzer, and an insertion point ranker. The shot detector is configured to divide a media stream comprising a plurality of frames into a plurality of shots. The scene transition analyzer is configured to group consecutive shots from the plurality of shots into a plurality of scenes. The scene transition analyzer is further configured to generate a first list of insertion points for introducing secondary media content into the media stream having primary media content. The insertion points of the first list are boundaries between consecutive scenes in the plurality of scenes. The insertion point ranker is configured to generate an insertion point saliency of the media stream at the insertion points in the first list. The insertion point ranker is further configured to generate a second list of insertion points. The insertion points are arranged in the second list to maximize a function of the insertion point saliency and a distance between each insertion point in the second list with other insertion points in the second list.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1, which includes

FIG. 8, which includes

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figures 1A, 1B:
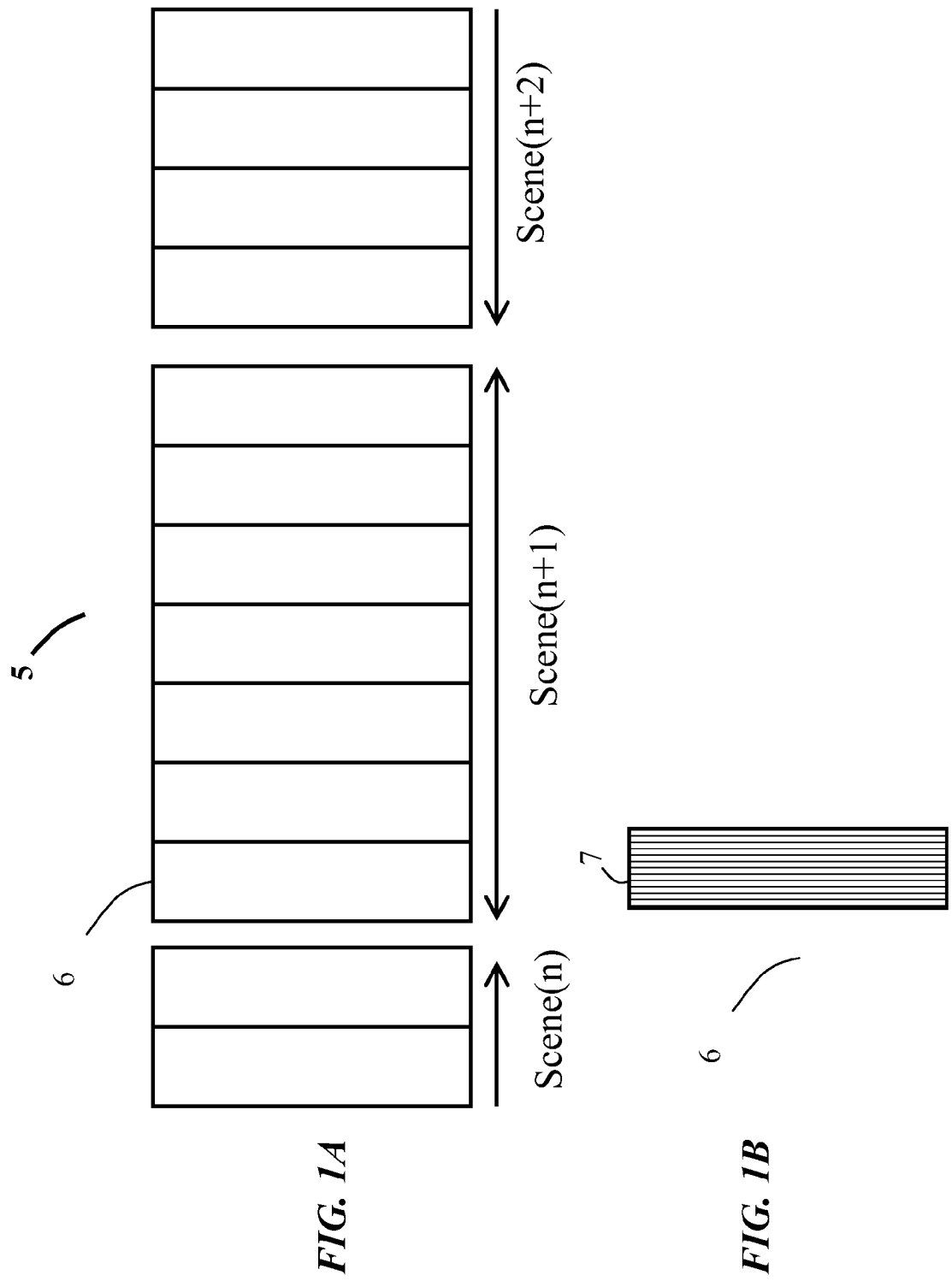
FIGS. 1A and 1B, illustrates a prior art hierarchical structure of media content.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the invention describe devices and methods for selecting insertion points for introducing secondary content such as ads into a media stream having primary content. In various embodiments, the insertion points are selected to minimize degradation of user experience due to the introduction of the secondary content. Embodiments of the invention may be applied during adaptive media streaming or during a post production stage of the media processing.

In various embodiments, content discontinuities, attractiveness and uniformity of distribution may be factored into so as to select insertion points for advertisements in a media stream. In various embodiments, content discontinuities may be evaluated based on video structure mining methods, such as shot/scene/story segmentation. In various embodiments, attractiveness may be measured using an user attention model, integrating audio-visual elements to estimate the attractiveness or importance to a user. In various embodiments, the advertisement insertion points are selected to have a fairly uniform distribution within the media stream using an isolation maximization process, which, for example, maximizes the distance between the ads in the media stream. In various embodiments, as will be described in further detail below, ad insertion points are first identified, and then an objective metric is used to re-rank the ads insertion points.

Embodiments of the invention for a process for inserting media advertisements will be described using FIG. 2. Further details of the embodiments will be described using FIGS. 3, 4, 5, 6, and 7. A media computing unit implementing embodiments of the invention will be described using FIGS. 8 and 9.

The embodiments of a media processing unit as described below in FIGS. 8 and 9 may also be described or illustrated in terms of methods comprising functional steps and/or non-functional acts. The following description and related flow diagrams illustrate steps and/or acts used in practicing example embodiments of the present invention. Usually, functional steps describe the invention in terms of results that are accomplished, whereas non-functional acts describe more specific actions for achieving a particular result or step. Although the functional steps and/or non-functional acts may be described or claimed in a particular order, the present invention is not necessarily limited to any particular ordering or combination of steps and/or acts. Further, the use (or non use) of "steps for" and/or "acts of" in the recitation of the claims—and in the following description of the flow diagrams(s) for FIGS. 2, 3, 4, 6, and 7—is used to indicate the desired specific use (or non-use) of such terms.

Figure 2:
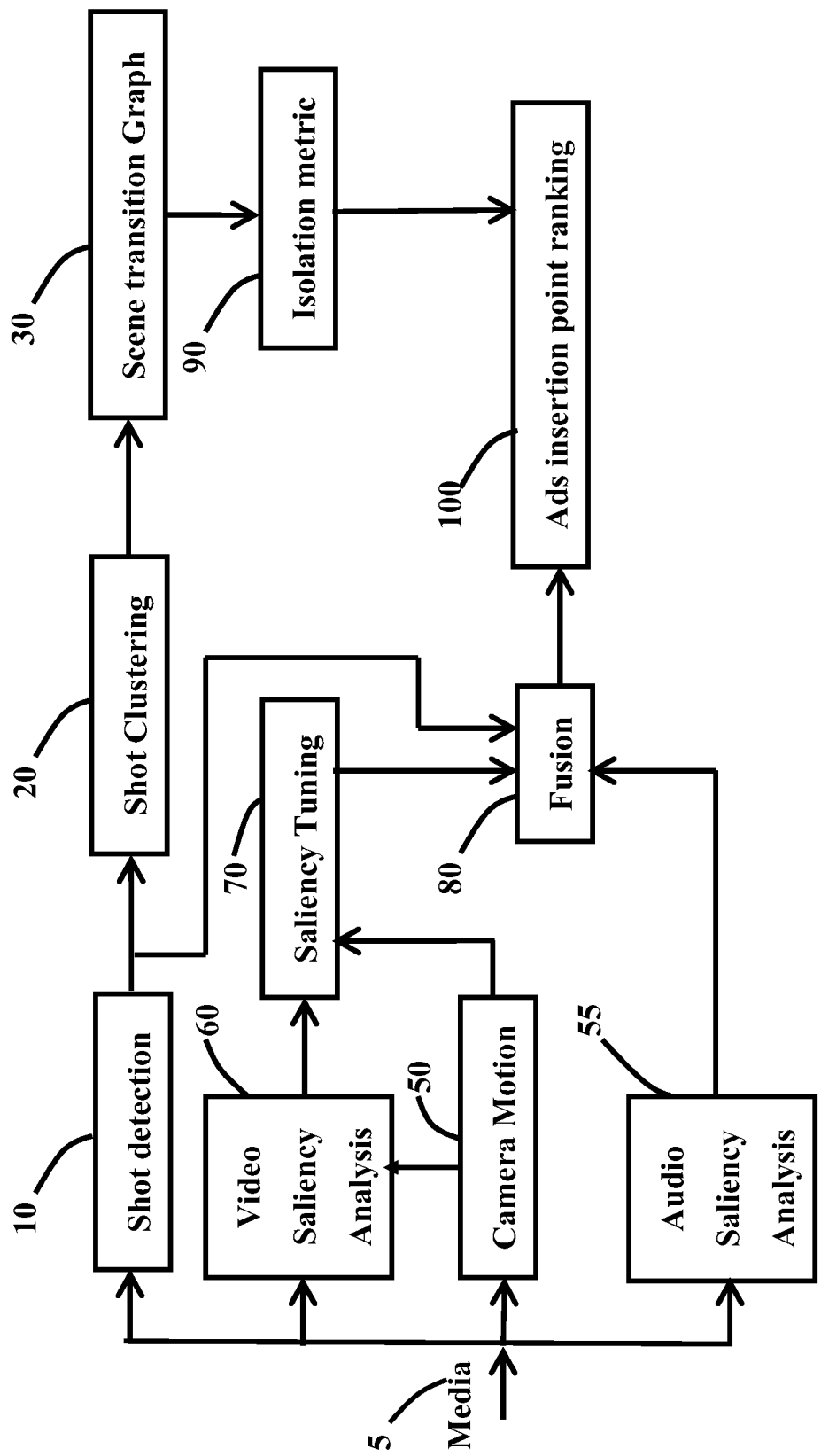
FIG. 2 illustrates a process for selecting insertion points for media advertisements in accordance with an embodiment of the invention.

FIG. 2 illustrates a process for selecting insertion points for media advertisements in accordance with an embodiment of the invention.

In various embodiments, media that is to be streamed, unicasted, or broadcasted is analyzed to identify insertion points for introducing advertisement (ads) which are non-obtrusive or degrade user experience while at the same inserting ads on a continual basis.

FIG. 2 illustrates the operations on an input media stream 5 for introducing ads. The input media stream 5 may be any type and format of media that is to be transmitted to a user or alternatively may be stored for future transmission. Referring to FIG. 2, shot detection (box 10) may be performed on a media stream 5 so as to divide the media into a series of shots.

The shots may be analyzed to identify information such as patterns, colors etc. For example, shots with similar attributes may share a common label. Consecutive shots having the same label may be clustered together (box 20). Such shots with similar information may be grouped together in to a scene. In one embodiment, a scene transition graph may be used to group shots into scenes (box 30).

Referring next to boxes 50, 55, 60, and 70, the media stream 5 is analyzed to identify an importance metric for each frame in the media stream. The importance of each frame may be performed separately for the video and audio portions by calculating a video saliency (box 60) and an audio saliency (box 55). The camera motion during the shots may be also be used to identify additional information on the importance of a sequence of shots (box 70). The video saliency, audio saliency, and the camera motion factor may be combined to generate a metric for media saliency for a given shot (box 80). For generating the shot media saliency, the location of shots may be received after the shot detection is performed.

In some embodiments, the saliency calculations (box 50, 55, 60, and 70) may be performed after identifying the set of insertion points. Therefore, in this embodiment, the saliency calculations are performed on only shots located at the boundaries of the scenes i.e. first and last shot within a scene. This reduces the computational load of the process.

Referring to box 90, the importance of each shot is combined with the set of all transition points between scenes to identify insertion points for ads. In one embodiment, the insertion points are selected to maximize isolation between insertion points especially between transition points having shots of high media saliency.

Thus, a ranking of transition points between all scenes may be obtained (box 100). Depending on the number of ads to be inserted a subset of the transition points may be used as insertion points.

Further details of the embodiments described above are described in details herein.

Figure 3:
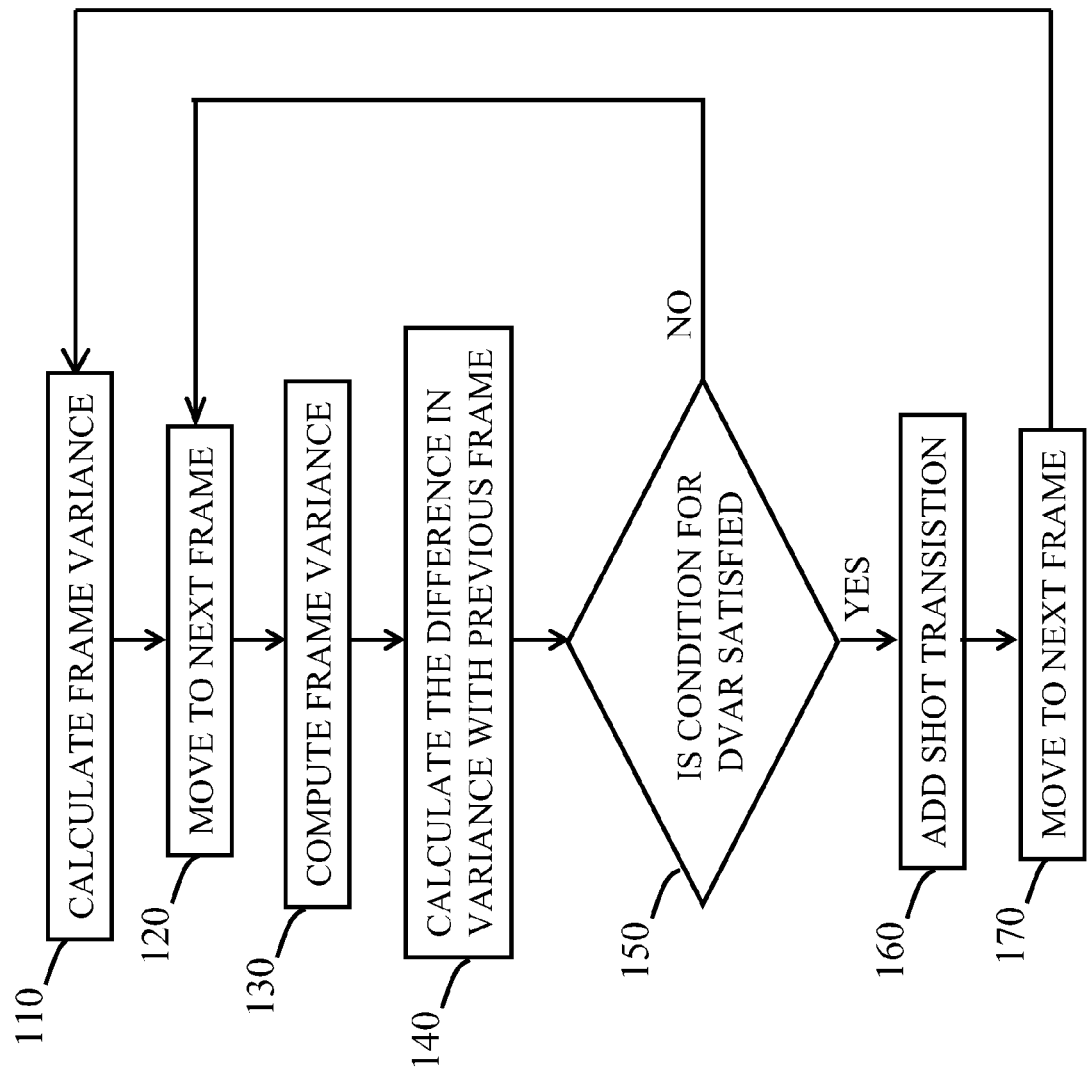
FIG. 3 illustrates a process for shot detection in accordance with an embodiment of the invention.

The shot detection process as described in box 10 of FIG. 2 will be first described. FIG. 3 illustrates a process for shot detection in accordance with an embodiment of the invention.

Shot detection is the temporal segmentation of a media stream 5. Shot detection segments the media into its basic units i.e. shots. During shot detection, the beginning and end points of a shot are identified, e.g., using frame index numbers.

In various embodiments, any suitable algorithm shot detection may be used. For example, the selection of the shot detection may be dependent on the type of shot transitions used. Shot transitions may be abrupt or cut transitions wherein one frame belongs to a first shot and the next frame belongs to a second shot. Alternatively, shot transitions may be gradual wherein two adjacent shots may be combined using chromatic, spatial or spatial-chromatic effects which gradually replace one shot by another. For example, the transition may be a gradual transition between a scene and a constant image (fade-out) or between a constant image and a scene (fade-in). Similarly, a first scene may fade-out and a second scene may fade-in (dissolve). Another common transition is a wipe, in which a line moves across the screen, with the new shot appearing behind the line.

In various embodiments, one or more shot detection algorithm may be applied to ensure detection of all shots, for example, separate algorithms optimized to detect abrupt transitions and gradual transitions may be used in some embodiments.

As illustrated in FIG. 3, a variance difference based shot detection scheme is used in one embodiment. This scheme is robust to detect the abrupt transitions while still yielding good performance to detect gradual transitions.

Referring to FIG. 3, a frame variance of a first frame is calculated (box 110). In one embodiment, the variance is calculated for the frame intensity. The first frame is the temporally first frame of a shot. The frame variance of the temporally next frame is calculated (boxes 120 and 130). The difference in variance between adjacent frames is calculated (box 140). A condition for delta variance is tested. A new shot is started if the condition(s) for the delta variance Dvar are satisfied (box 160). Alternatively, if the condition is not met, the frame variance of the next frame is calculated (boxes 120 and 130) and the algorithm proceeds as described above. If a new shot is described, then the next frame is assumed to be a first frame of the second shot (box 170) and the algorithm proceeds as described above (box 110).

In one or more embodiments, three conditions for delta variance may be tested as follows. First, the delta variance is compared to a stability threshold (Th1). To satisfy the condition for starting a new shot, the delta variance (Dvar) is smaller than the stability threshold i.e. Dvar<Th1.

Second, the maximum difference in delta variance (maxDvar) from the starting or first frame until the current frame is calculated. Similarly, a minimum difference in delta variance (minDvar) from the starting frame until the current frame is calculated. The difference between the maximum delta variance and the minimum delta variance is more than a tolerance threshold (Th2) for the condition to be satisfied i.e. maxDvar−minDvar>Th2.

Third, the condition (box 160) may also require that the total number of frames (FN) in the current shot is larger than a certain predetermined number of frames (FN*) to enforce a minimum shot length i.e. FN>FN*.

In one or more embodiments, all the above conditions are satisfied. In some embodiments, however, only some of the above conditions are satisfied.

In alternative embodiments, shot boundaries may also be found using color histogram based approaches or optical-flow motion features.

Scene detection will next be described as referenced by shot clustering (box 20 of FIG. 2) and scene transition graph (box 30 of FIG. 2). In various embodiments, shots are clustered into different concept patterns and analyzed using scene transition graphs. In one or more embodiments, a key frame for each shot may be identified and color histograms may be used as shot features. For example, other alternative visual features could be used to replace color histogram, like global image scene feature (GIST), scale invariant feature transform (SIFT), local binary patterns (LBP), and bags of visual words etc. Color histogram is a relatively simpler feature in visual description. In one particular example, a color histogram with red (R), green (G), and blue (B) components, having a total of 8×8×8 bins may be used.

In one embodiment, shot clustering may be performed using the k-means method. The number of clusters is pre-defined, for example, equal to 20. Shots with bigger variance may use more number of clusters. The k-means clustering is a method of cluster analysis which aims to partition a set of observations into a number of clusters in which each observation belongs to the cluster with the nearest mean. Embodiments of the invention may also use alternative methods for clustering such as k-medoid, ISODATA, EM, spectral clustering, and mean shift etc.

The scene transition graph will be described next (box 30 of FIG. 2). A number of interrelated shots unified by location or dramatic incident constitute a scene.

Commonly, scene boundary detection may be performed using low-level features, e.g., frames, shots, without any prior knowledge. Therefore, the detected scene boundaries may not correspond precisely to those of an actual scene. To address this issue, a computable scene or logical story unit (LSU) may be used to best approximate a real movie scene. Unlike actual scenes that are defined by their semantic contents, LSUs are defined in terms of specific spatio-temporal features which are characteristic of the scene under analysis.

For example, a scene transition graph (STG) may be defined as a directed graph, such that a node contains a collection of shots with sufficiently similar visual content and a directed edge is drawn from one node U to another node W if there is a shot in node U that immediately precedes a shot in node W.

In various embodiments, label sequence may be used to segment a video into scenes because of the intense interactions between shots in a scene. A visual concept label is associated with each shot in order to segment video scenes. Multiple visual concepts may co-exist in a single scene. Therefore, shots with similar visual concepts are linked together into a single scene.

In various embodiments, a label sequence can be used to segment a video into large LSUs, each of which closely approximates a semantic scene.

Selection of shots into a scene will now be described in accordance with an embodiment of the present invention. A shot si is first labeled with a visual label Li, for example, based on content, pattern etc as described above. The last occurrence of a visual concept label, e.g., a label A, from going from shot index g to shot index (g+η) is defined as last(A,g)=max$_{g \leq i \leq g+\eta}$ (i:L$_i$=A), where i represents the current shot index and η represent the maximum number of shots to look ahead. In one example, we may look three steps ahead, therefore set η=3. Therefore, last(A,g) is the next location of the visual concept label "A," if A is present in the next η shots.

In various embodiments, a L-table of last(A,g) may be constructed to derive the scene transition graph (STG). In one embodiment, a process to detect a scene may proceed as follows.

First, the variables are initialized for the first shot index "m." The variable "e" is assigned to the last(L$_l$, m) so that it represents the next location of the visual concept label of the first shot index "m." Therefore, in the first step, the variables are assigned as follows.

$$\text{Set } l \leftarrow m; \text{ Set } e \leftarrow \text{last}(L_l, m) \tag{1}$$

Next, a look ahead operation is performed so that intermediate shots that are between closely spaced shots and that have the same visual concept label are grouped together. Therefore, the variables are evaluated as follows in the second step.

While l≤e do {

$$\{\text{If } (\text{last}(L_l, m) > e) \; e \leftarrow \text{last}(L_l, m)\} \tag{2}$$

$$l \leftarrow l+1\}. \tag{3}$$

After proceeding through the above loop, all shots that are within "m" and "e" are part of the same scene. In other words, shots s$_m$, s$_{m+1}$, . . . , s$_{m+e}$ constitute a scene.

In various embodiments, the algorithm examines the sequence of labels and identifies the subsequences of labels that are of minimal length and which contains all the recurring labels. For example, given a media shot sequence with ten shots with the following labels: A, B, A, C, D, F, C, G, D, F. If η=3, the first scene includes the first three shots, and the second scene includes the next 4 shots C, D, F, C, and the third scene includes the remaining shots. Alternatively, if instead, the labels of the media shot sequence is A, B, A, C, D, A, C, G, D, C, the first scene includes the first six shots: A, B, A, C, D, A, and the second scene includes the next three shots C, G, D, and C. In alternative embodiment, other criterion may be adopted for selecting the shots for a scene.

In various embodiments, boundaries between adjacent shots within a scene may be removed so that remaining shot boundaries form the scene boundaries. In other words, scene boundaries may be the shot boundaries between adjacent scenes.

Figure 4:
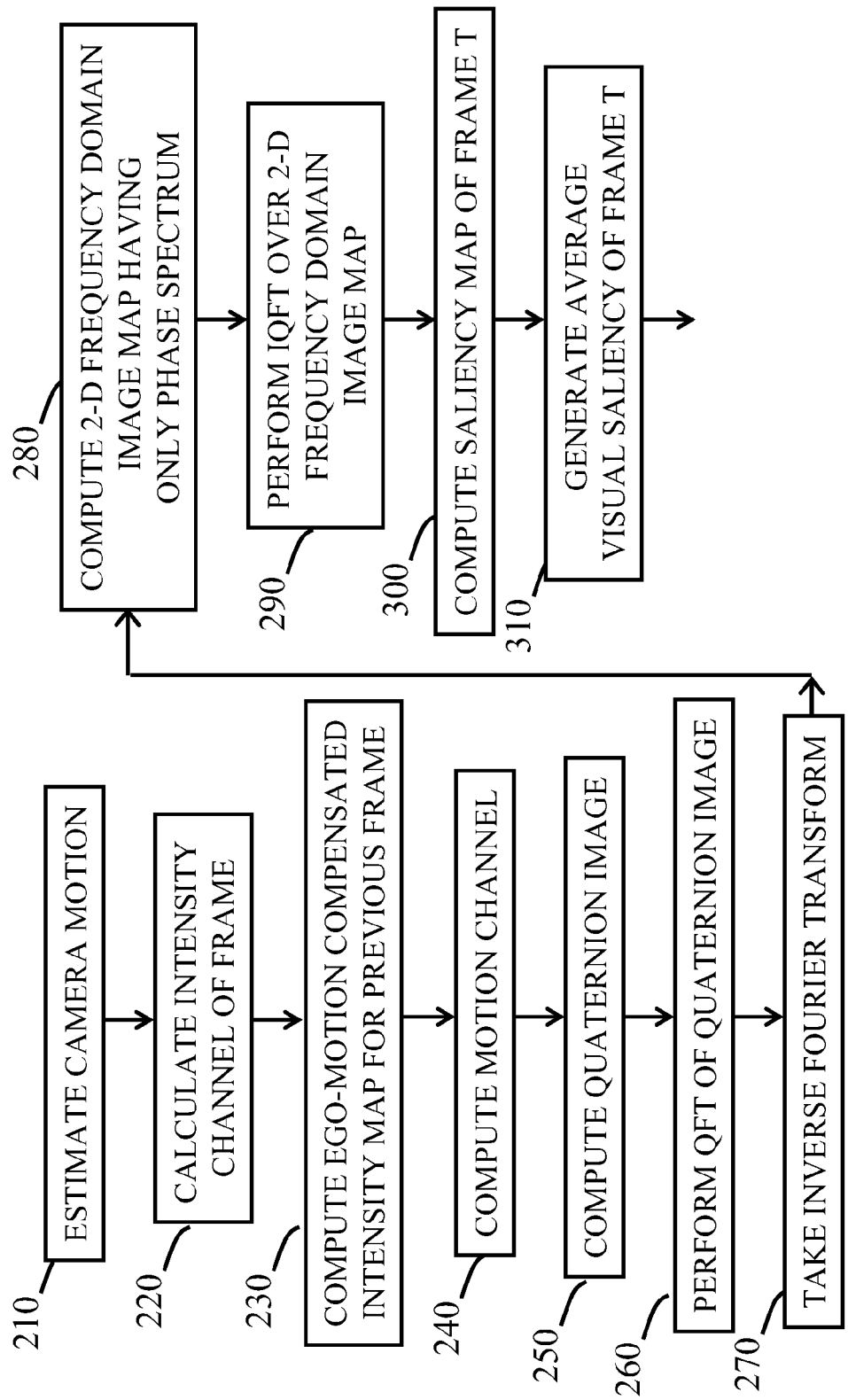
FIG. 4 illustrates further details on generating an average saliency for a media frame in accordance with an embodiment of the invention.

FIG. 4 illustrates details on generating an average saliency for a media frame in accordance with an embodiment of the invention. Further details of computing saliency is described in our disclosure titled "Video Summarization: A Dynamic Programming-based Global Optimization Approach with Aural and Spatial-temporal Visual Features," by J. Gao, Y Huang, H Yu, U.S. Provisional Application 61/413,836, filed on Nov. 15, 2010, which is incorporated by reference herein.

The average saliency computation as described in boxes 50-60 in FIG. 2 is further described using FIG. 4 in accordance with embodiments of the invention. In particular, the computation of the video saliency (box 60) will be first described followed by the computation of the audio saliency (box 55). Then, the fusion of the computed audio saliency with the computed video saliency will be described (box 80).

In various embodiments, the saliency computation is performed at each frame by fusing both visual saliency and audio saliency values.

The movement of the camera through an environment, e.g., a fixed background is the ego-motion. The impact of ego-motion must be incorporated in determining the saliency of a frame. As described further in detail, this is accomplished by computing a motion channel having a difference in intensity map and an ego-motion compensated intensity map.

Referring to FIG. 4, the camera motion between adjacent frames is estimated (box 210). Camera motion between two adjacent frames can be computed by estimating a 2-D rigid transformation based on the corresponding KLT (Kanade-Lucas-Tomasi Feature Tracker) keypoint tracks on the two adjacent frames. Embodiments of the invention also include alternative methods such as SIFT matching or Speeded Up Robust Features (SURF) correspondence etc.

Suppose a KLT keypoint is located at (x,y) in frame t, the corresponding KLT keypoint is tracked at (x',y') in frame (t+1), and the transformation from (x,y) to (x',y') can be expressed as follows.

$$\begin{bmatrix} x' \\ y' \end{bmatrix} = A \begin{bmatrix} x \\ y \end{bmatrix} + b = \begin{bmatrix} s\cos\theta & s\sin\theta \\ -s\sin\theta & s\cos\theta \end{bmatrix} \begin{bmatrix} x \\ y \end{bmatrix} + \begin{bmatrix} b_x \\ b_y \end{bmatrix} \tag{4}$$

In equation 4 above, s, θ, b$_x$, and b$_y$ are camera parameters, wherein s is the zooming factor, θ is the counterclockwise rotation degree, b$_x$ corresponds to the pan movement, and b$_y$ corresponds to the tilt movement.

For a set of KLT keypoint correspondences, the matrix A and vector b may be solved using the robust RANSAC (RANdom SAmple Consensus) rigid transformation estimation, which is a known iterative method to estimate parameters of a mathematical model from a set of observed data having outliers. RANSAC is a non-deterministic algorithm in the sense that it produces a reasonable result only with a certain probability, which increases with the number of allowed iterations. Embodiments of the invention may also use alternative methods such as Least Median of Squares or M-Estimator etc.

After estimating the camera motion parameters, the visual saliency of each frame may be determined. The camera motion may be applied to compensate the ego motion and the residual may be fused into the color information to generate visual saliency.

Next, the intensity channel I(t) of a frame t is calculated using the color channels of the frame as follows (box 220). A given frame t may comprise red r(t), green g(t), and blue b(t) channels. Four broadly tuned color channels may be generated by the following equations.

$$R(t) = r(t) - (g(t) + b(t))/2 \tag{5}$$

$$G(t) = g(t) - (r(t) + b(t))/2 \tag{6}$$

$$B(t) = b(t) - (r(t) + g(t))/2 \tag{7}$$

$$Y(t) = (r(t) + g(t))/2 - |r(t) - g(t)|/2 - b(t) \tag{8}$$

In addition, two color difference channels are defined as following.

$$RG(t)=R(t)-G(t) \quad (9)$$

$$BY(t)=B(t)-Y(t) \quad (10)$$

The intensity channel is calculated as follows.

$$I(t)=(r(t)+g(t)+b(t))/3 \quad (11)$$

The ego-motion compensated intensity map $I(t-\tau)$ for the previous frame $(t-\tau)$ is computed (box 230). The motion channel M(t) is computed as an absolute difference between intensity map I(t) and ego-motion compensated intensity map $I(t-\tau)$ as follows (box 240).

$$M(t)=|I(t)-(A_{t-\tau}^t I(t-\tau)+b_{t-\tau}^t)| \quad (12)$$

In equation 12, $A_{t-\tau}^t$ and $b_{t-\tau}^t$, are the estimated camera parameters from frame $(t-\tau)$ to frame t.

Next, the frame t can be represented as a quaternion image q(t) (box 250).

$$q(t)=M(t)+RG(t)\mu_1+BY(t)\mu_2+I(t)\mu_3 \quad (13)$$

In equation 13, $\mu_j^2=-1$, j=1, 2, 3; and $\mu_1 \perp \mu_2$, $\mu_1 \perp \mu_3$, $\mu_2 \perp \mu_3$, $\mu_3=\mu_1\mu_2$. We can further represent q(t) in symplectic form as follows.

$$q(t)=f_1(t)+f_2(t)\mu_2 \quad (14)$$

$$f_1(t)=M(t)+RG(t)\mu_1 \quad (15)$$

$$f_2(t)=BY(t)+I(t)\mu_1 \quad (16)$$

A Quaternion Fourier Transform (QFT) is performed on the quaternion image q(n, m, t), where (n, m) is the location of each pixel in time domain (box 260).

$$Q[u, v] = F_1[u, v] + F_2[u, v]\mu_2 \quad (17)$$

$$F_i[u, v] = \frac{1}{\sqrt{MN}} \sum_{m=0}^{M-1} \sum_{n=0}^{N-1} e^{-\mu_1 2\pi((mv/M)+(nu/N))} f_i(n, m) \quad (18)$$

In above equations, (u,v) is the locations of each pixel in frequency domain, while N and M are the image's height and width.

The inverse Fourier transform is obtained as follows (box 270).

$$f_i(n, m) = \frac{1}{\sqrt{MN}} \sum_{v=0}^{M-1} \sum_{u=0}^{N-1} e^{\mu_1 2\pi((mv/M)+(nu/N))} F_i[u, v] \quad (19)$$

Frequency domain representation Q(t) of the quaternion image q(t) can be rewritten in the polar form as follows (box 280).

$$Q(t)=\|Q(t)\|e^{\mu \Phi(t)} \quad (20)$$

where $\Phi(t)$ is the phase spectrum of Q(t).

In equation 20, if we set $\|Q(t)\|=1$, the frequency domain representation Q(t) of the quaternion image q(t) includes only the phase spectrum in frequency domain. Therefore, the inverse Quaternion Fourier Transform (IQFT) of the phase spectrum of the frequency domain representation Q(t) of the quaternion image q(t) may be performed. The IQFT of the phase spectrum q'(t) is a 2-D image map and may be computed as follows (box 290).

$$q'(t)=a(t)+b(t)\mu_1+c(t)\mu_2+d(t)\mu_3 \quad (21)$$

The saliency map (sM(t)) of frame t may be obtained by taking a smoothing filter kernel and running a convolution with the 2-D image map q'(t) (box 300).

$$sM(t)=g*\|q'(t)\|^2 \quad (22)$$

where g is a 2-D Gaussian smoothing filter. In various embodiments, for computation efficiency, only the Phase Spectrum of Quaternion Fourier Transform (PQFT) on a resized image (e.g., whose width equals to 128) may be computed.

Next, the visual saliency value $S_v(t)$ of the frame t may be computed by taking the average over the entire saliency map as follows (box 310).

$$S_v(t) = \frac{1}{MN} \sum_{m=0}^{M-1} \sum_{n=0}^{N-1} sM(n, m, t) \quad (23)$$

Embodiments of the invention for tuning the saliency to account for camera motion will next be described (box 70 of FIG. 2).

Camera motion may be utilized to emphasize or neglect certain objects. Alternatively, camera motion may be used to guide viewers' attentions during a scene.

In one or more embodiments, the rigid motion estimation as described above (e.g., box 210 of FIG. 4), may be used to determine the camera motion type and speed. However, further information is required to understand the relationship between camera motion and the significance of a particular camera motion in guiding a user. For example, it is necessary to be able to map the computed camera parameters to their ability to attract a viewer's attention. Embodiments of the invention use general camera work rules to set up an user attention based model.

The user attention based model is obtained based on the following assumptions from general movie production. First, zooming is assumed to emphasize something. In particular, the speed of zooming scales linearly with the importance of the media segment. Therefore, faster zooming speeds describe important content. Usually, zoom-in is used to emphasize details, while zoom-out is used to emphasize an overview scene. Second, a video producer may apply panning if the video producer wants to neglect or de-emphasize something. As in zooming, the speed of the panning operation may be used a metric of importance. Unlike zooming, the faster the panning speed is, the less important the content is.

The visual saliency value $S_v(t)$ of frame t is then scaled by the corresponding camera attention factor $\omega_{cm}(t)$. Therefore, the effective visual saliency $S_v^*(t)$ is computed as $S_v^*(t) \leftarrow \omega_{cm}(t) \cdot S_v(t)$.

In various embodiments, an attention factor $\omega_{cm}$ caused by camera motion is quantified over a pre-determined range, for example, [0~2]. For example, a value greater than 1 may represent emphasis, while a value smaller than 1 may represent neglect.

Embodiments of the invention for calculating the audio saliency will next be described.

In various embodiments, audio saliency may be measured by a variety of low-level audio features (scalar values), including Spectral Centroid, Root Mean Square (RMS), Absolute Value Maximum, Zero-Crossing Ratio (ZCR), and Spectral Flux. In various embodiments, any suitable algorithm for calculating the audio saliency may be used. The audio saliency value calculated for an audio clip that is aligned with the boundary of the video frame t is represented as $S_a(t)$.

The visual and audio saliency are combined together in various embodiments to generate a single saliency for the frame (box 80 of FIG. 2).

In one embodiment, the audio and video saliency are combined linearly by combining normalized video and audio saliencies as described below. The linear fusion of visual and audio saliency values of frame t may be computed to generate a frame saliency $S_f(t)$.

$$S_f(t)=\alpha \tilde{S}_v(t)-(1-\alpha)\tilde{S}_a(t) \tag{24}$$

In equation 24, $\tilde{S}_v(t)$ and $\tilde{S}_a(t)$ are the normalized visual and audio saliency values, respectively, and alpha $\alpha$ controls the relative importance between visual and audio saliency. In one or more embodiments, alpha may be $\alpha \in [0,1]$, and 0.5 in one embodiment.

The normalized video saliency for the frame t is computed by normalizing over the difference in the maximum and minimum video saliencies computed so far because the exact maximum and minimum amplitude are not known. For example, the normalized video saliency for the frame t is computed as $$\tilde{S}_v(t) = \frac{S_v^*(t) - \min_{t'}\{S_v^*(t')\}}{\max_{t'}\{S_v^*(t')\} - \min_{t'}\{S_v^*(t')\}}. \tag{25}$$

The normalized audio saliency for the frame t is computed similarly, and may be calculated as follows in one embodiment.

$$\tilde{S}_a(t) = \frac{S_a(t) - \min_{t'}\{S_a(t')\}}{\max_{t'}\{S_a(t')\} - \min_{t'}\{S_a(t')\}}. \tag{26}$$

The saliency of a shot s may now be computed from the saliency of the frame t computed above. In one embodiment, an average of the frame saliency over all the frames in the shot s may be used to define a shot saliency X(s) over the shot s as follows.

$$X(s) = \frac{1}{len(s)} \sum_{i \in s} S_f(t), \tag{27}$$

where X(s) is the average saliency values of the frames in shot s, and len(s) represents the number of frames in shot s.

Embodiments of the invention for re-ranking the insertion points will now be described (boxes 90 and 100 of FIG. 2) using FIGS. 5 and 6.

In various embodiments, the priority of the ads insertion points is estimated based on the saliency and an isolation metric. The saliency, which may be computed as described above, establishes the importance of the media content while the isolation metric ensures the distance between the selected insertion points is maximized.

Figure 5:
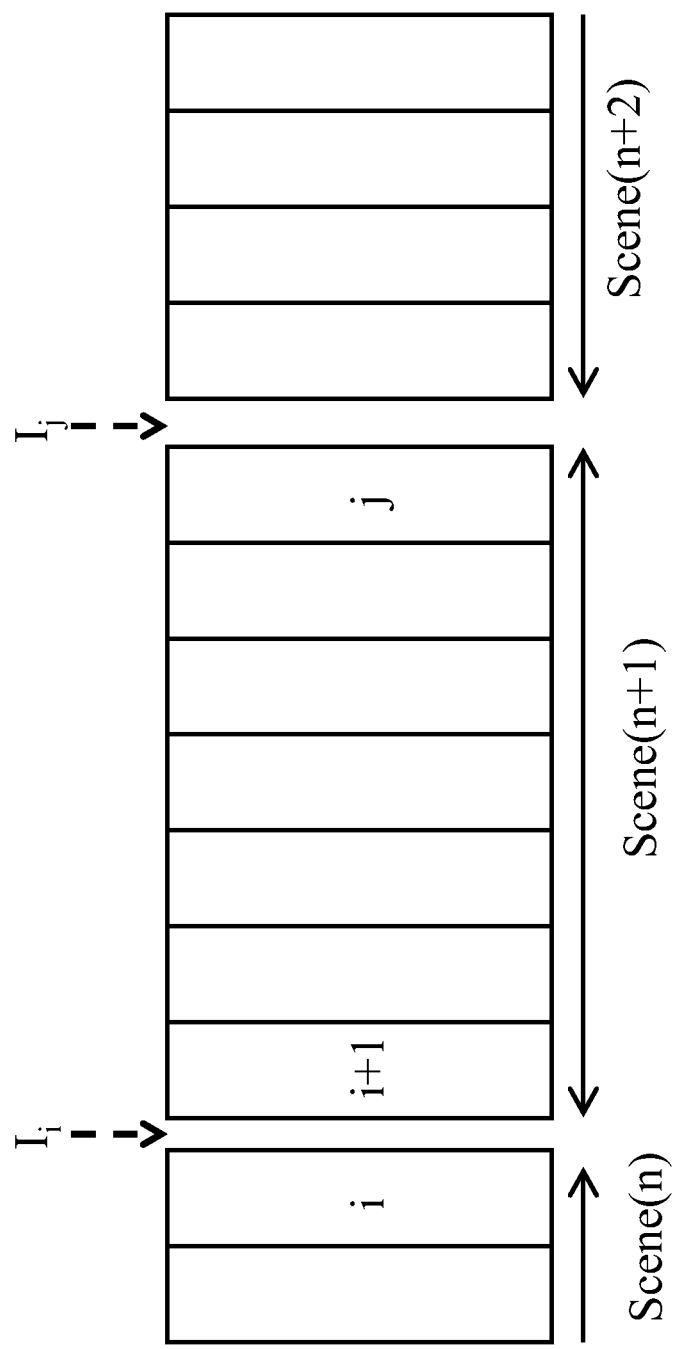
FIG. 5 illustrates a media stream during the re-ranking calculation process in accordance with an embodiment of the invention.

FIG. 5 illustrates the media stream during the re-ranking calculation process as will be described further using FIG. 6. In FIG. 5, a plurality of scenes comprising a first scene (scene(n), a second scene (scene(n+1)), and a third scene (scene(n+2)) are illustrated. The distance between adjacent insertion points $I_i$ and $I_j$ may be $dist(I_i, I_j)$.

The ranking process is performed by iterating through a list of all insertion points. The distance between adjacent insertion points $I_i$ and $I_j$ $dist(I_i, I_j)$ is a frame-based distance metric between two insertion points.

Figure 6:
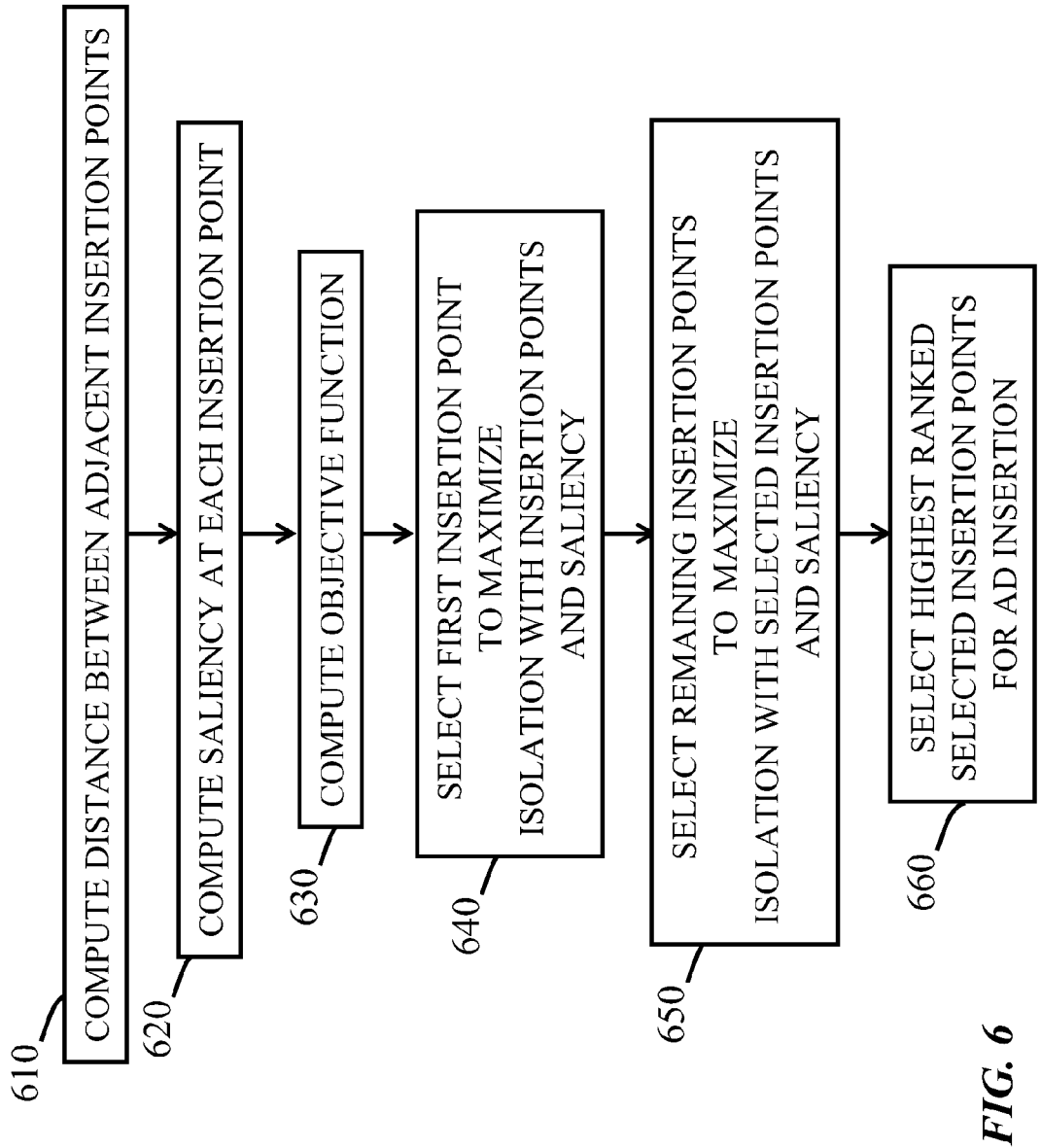
FIG. 6 illustrates a process for re-ranking insertion points process factoring the importance of the media content and an isolation metric so as to uniformly distribute the insertion points within the media stream in accordance with an embodiment of the invention.

FIG. 6 illustrates a process for re-ranking insertion points process factoring the importance of the media content and an isolation metric so as to uniformly distribute advertisement insertion points within the media stream in accordance with an embodiment of the invention.

The distance between all insertion points are computed (box 610). In one embodiment, distance between insertion points $I_i$ and $I_j$ may be given as $$dist(I_i, I_j) = \exp[\lambda \cdot (d(I_i, I_j) - \bar{d})/L], \tag{28}$$

where $\bar{d}$ is the average number of frames between two nearby insertion points in the uniform sampling of insertion point pairs, $d(I_i, I_j) = |I_i - I_j|$ represents the number of frames between insertion points $I_i$ and $I_j$, L is the total number of frames in the video, and lamda $\lambda$ is a variance constant.

In an alternative embodiment, the distance between adjacent insertion points $I_i$ and $I_j$ may be given as follows.

$$dist(I_i, I_j) = \exp[\lambda \cdot |I_i - I_j|/L]. \tag{29}$$

Again in calculating the distance $dist(I_i, I_j)$ of equation 29, L is the total number of frames in the video, and lamda $\lambda$ is a variance constant. A bigger lamda $\lambda$ results in giving less importance to saliency relative to the isolation influence. In various embodiments, other algorithms for calculating the distance may be used.

The saliency value at the insertion point $(X(I_i))$ may be computed as an average between the average shot saliency values at the scene boundary (box 620).

$$X(I_i) = 0.5 \cdot [X(i) + X(i+1)]. \tag{30}$$

where, X(i) is the average shot saliency, for example, computed using equation 27. In various embodiments, the saliency values are modified in advance before constructing the scene structure, i.e., re-estimating the average saliency of those shots in the same scene. Further, in some embodiments, the distance is weighted with the saliency at scene boundaries (i,i+1) only.

An objective function is computed taking into account the saliency value at the insertion point $(X(I_i))$ and the distance $dist(I_i, I_j)$ to other insertion points (box 630), for example, using an operator F. In one embodiment, for each insertion point, the objective function is computed as a sum over all the remaining insertion points.

$$Obj = \sum_{I_j \in Ins} F(dist(I_i, I_j), \cdot X(I_i)), \forall I_i \in Ins \tag{31}$$

In various embodiments, an insertion point with the highest objective function is selected as the first insertion point (box 640). In one embodiment, an insertion point having the highest saliency-weighted sum distance with other insertion points is selected to have a higher rank. Therefore, in one embodiment, $$\max_{I_0} = \sum_{I_j \in Ins} dist(I_i, I_j) \cdot X(I_i), \forall I_i \in Ins, \tag{32}$$

where Ins is the set of insertion points.

After selecting the first insertion points, subsequent insertion points are selected. For example, using a modified objective function, e.g., based on their isolation with the selected insertion points from the set of selected insertion points SIns (box 650). Therefore, in one embodiment, the largest saliency-weighted sum distance to the insertion points in set SIns are selected. For example, $$\max_{I_0} = \sum_{I_j \in SIns} dist(I_i, I_j) \cdot X(I_i), \forall\ I_i \in Ins, I_j \in SIns \quad (33)$$

Consequently, each time, insertion points are selected to maximize the point diversity with the approximation of a uniform distribution.

In some embodiments, after ranking all the insertion points, a subset of the higher ranked insertion points are selected for introducing ads (box 660). Alternatively, the ranking process may be stopped when certain number of insertion points have been selected into the second set SIns.

In an alternative embodiment, service providers may provide a specific type of insertion point, for example, in the middle of an event or scene, to insert, for example, secondary content such as ads. Embodiments of the invention may be used to insert secondary content in such cases and may be very valuable for many application, such as, for example, video content industry, including news, movies, and other types of TV contents etc.

Many factors have been determined to impact consumers' perceptions of the intrusiveness of ads in traditional TV programs. As an illustration, in one or more embodiment, a few factors that are computable are selected. In one embodiment, content discontinuities and attractiveness are selected for identifying and ranking insertion points for secondary content. For example, in some embodiments, secondary content may be inserted at the shot boundaries with low discontinuity and high attractiveness to enhance viewer's perspective. On the other hand, high discontinuity and high attractiveness may be a tradeoff between viewers and advertisers.

In various embodiments, any combination of attractiveness and discontinuity may be selected. For example, attractiveness and discontinuity may be computed and linearly combined to form an objective function for ranking a given set of possible insertion points. The weighting of the factors changes the objective function.

In the above described embodiments, for example, of FIG. 6, an algorithm for low discontinuity is selected while maximizing attractiveness. Therefore, in FIG. 6, the weighting favors the attractiveness over discontinuity.

In various embodiments, attractiveness may be computed from saliency, for example, as described in equation 30. However, in some embodiments, high discontinuity may be selected as the insertion points. For example, high discontinuity insertion points may be selected from the media information which may include event information. For example, boundaries between subsequent events have high discontinuity. In such embodiments, event boundaries may be selected as the insertion points.

Figure 7:
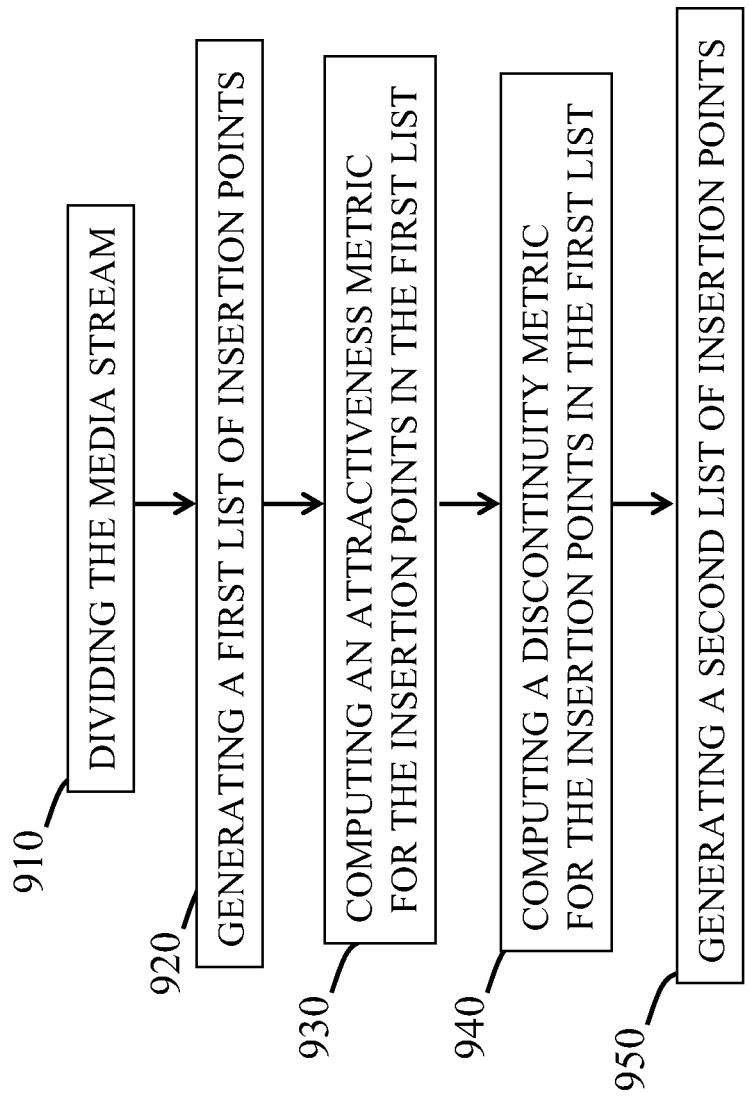
FIG. 7 illustrates a method for inserting secondary content into a media stream having primary content in accordance with another embodiment of the invention.

Referring to FIG. 7, a method for inserting secondary content into a media stream having primary content is described. The method includes dividing the media stream comprising a plurality of frames into a plurality of shots (box 910). A first list of insertion points for introducing the secondary content is generated (box 920). An attractiveness metric is computed for the media stream at the insertion points in the first list (box 930). A discontinuity metric is computed for the media stream at the insertion points in the first list (box 940). Next, a second list of insertion points is generated (box 950). In various embodiments, the insertion points are arranged in the second list to maximize a function of the attractiveness metric and the discontinuity metric.

Figure 8A:
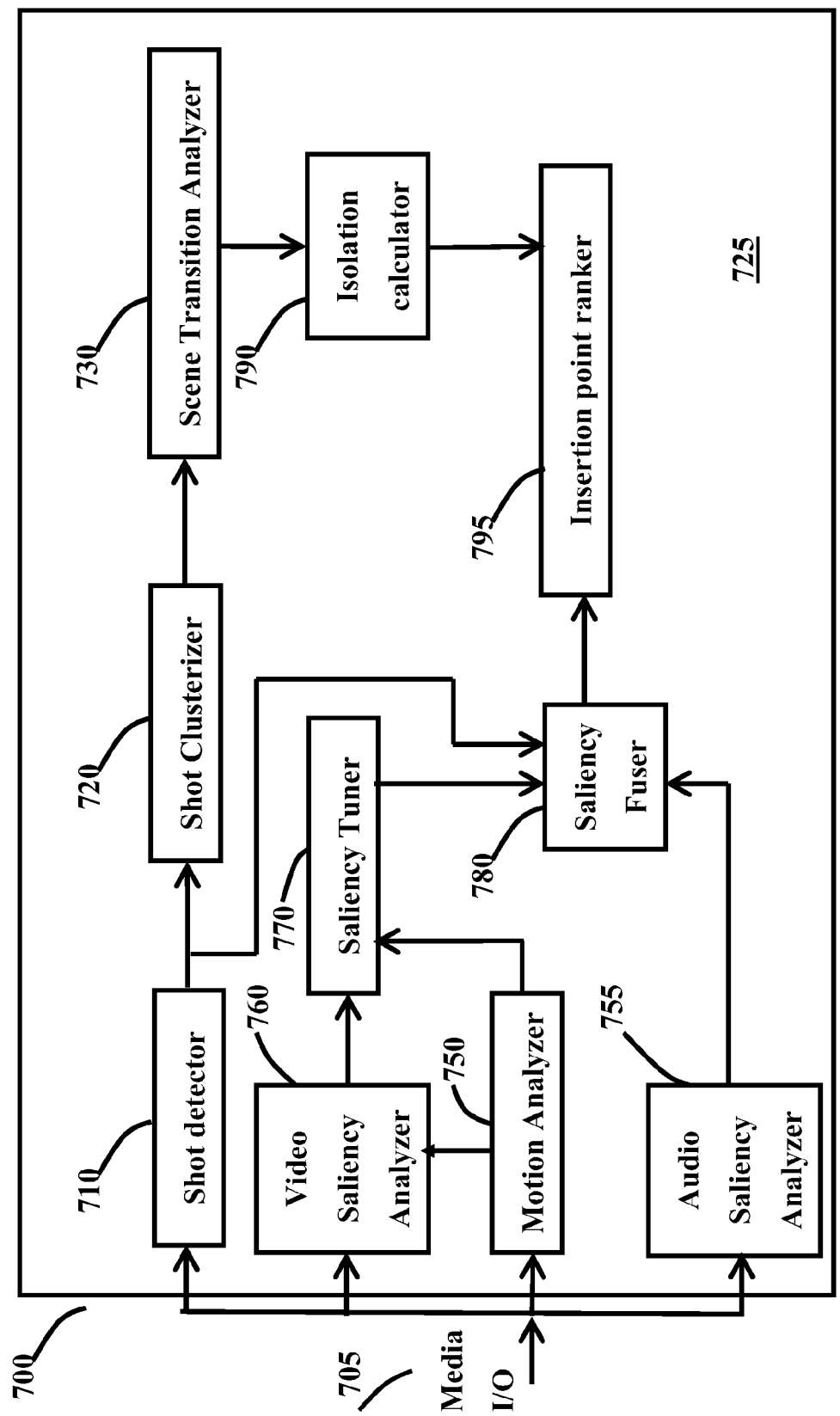
FIGS. 8A and 8B, illustrates components of a media computer in accordance with embodiments of the invention.
Figure 8B:
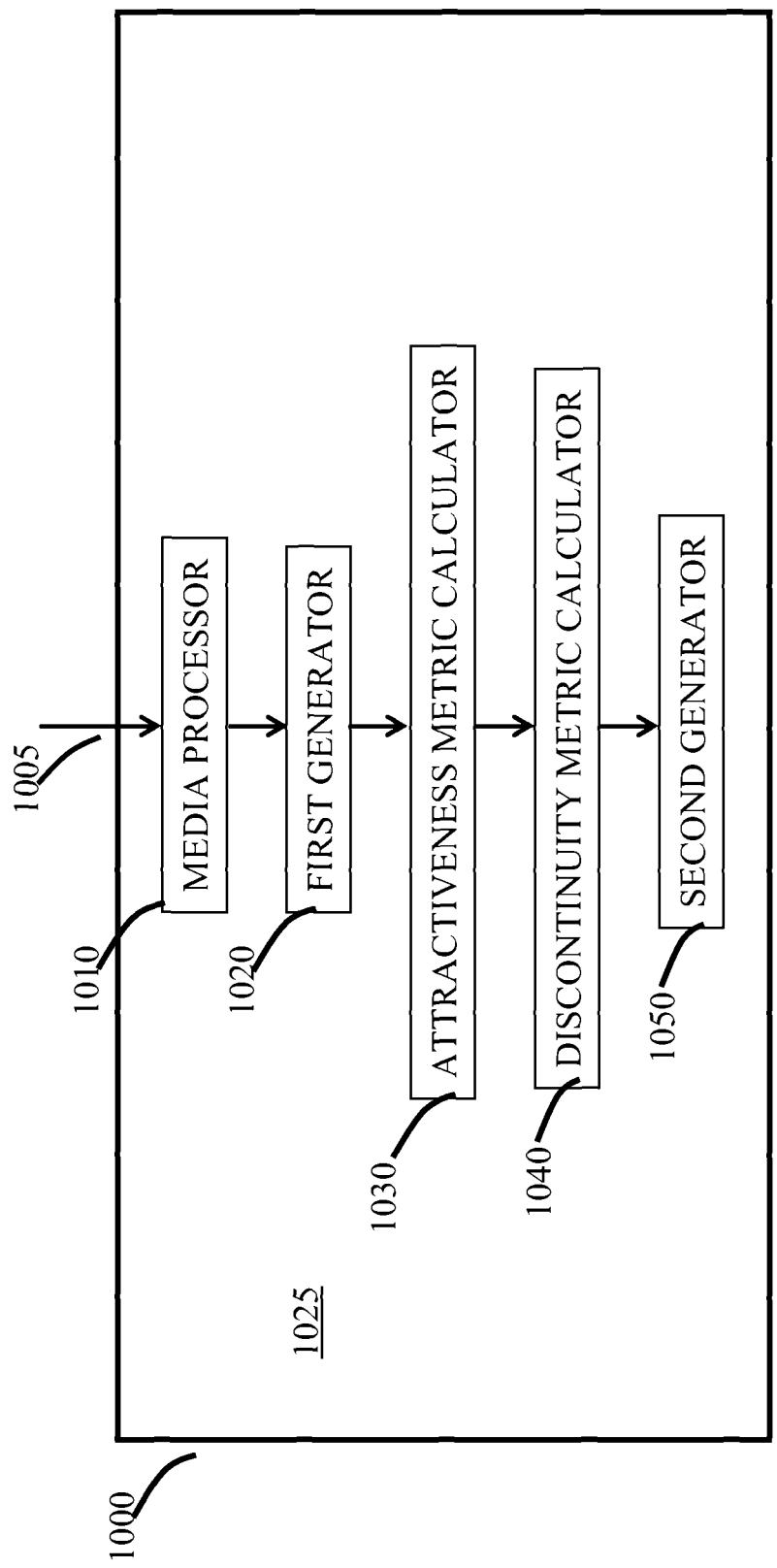

FIG. 8, which includes FIGS. 8A and 8B, illustrates components of a media computing unit in accordance with embodiments of the invention.

The media computing unit may be a networked computer, standalone computer, laptop, netbooks, hand held device including cell phones, smart phone, and other user devices used in media processing.

Referring to FIG. 8A, the media computing unit 700 comprises a media processor 725 which is configured to execute instructions to perform media processing on the media stream, which may be introduced into the media computing unit 700 through the I/O unit 705.

The media stream may be analyzed either sequentially or in parallel within the media processor 725, which may be a single core or multi-core processor including multiple parallel processors.

A shot detector 710 analyzes the media stream and identifies location of shot transition points. In one embodiment, the shot detector 710 may use a variance based method as described with respect to FIG. 3. Next a shot clusterizer 720 evaluates the content of the shot and groups together shots that may be similar in content. For example, in one embodiment, the shot clusterizer 720 assigns a shot label to each shot after evaluating the patterns, colors etc. of the shot. The output from the shot clusterizer 720 is inputted into a scene transition analyzer 730, which generates scenes, each scene having a plurality of shots, thereby identifying a set of insertion points for inserting media advertisements. In one embodiment, the scenes may be generated by grouping together shots based on a scheme described with respect to equations 1-3. In one or more embodiments, the shot clusterizer 720 and the scene transition analyzer 730 may be combined into a single unit. An isolation calculator 790 calculates the distance between insertion points in the set of insertion points generated by the scene transition analyzer 730.

The media stream is also analyzed using a video saliency analyzer 760, which may also take information from a motion analyzer 750 that analyzes the motion of the camera which generated the media. The video saliency analyzer 760 generates a visual saliency map for each frame of the media, for example, as described with respect to FIG. 4.

The output from the video saliency analyzer 760 and the motion analyzer 750 may be input into a saliency tuner 770, which produces an output that scales the visual saliency of a media frame based on the camera action such as zooming, panning etc.

An audio saliency analyzer 755 generates a saliency for the media frame. The video saliency from the saliency tuner 770 and the audio saliency from the audio saliency analyzer 755 are combined or fused together and a combined saliency is generated at a saliency fuser 780. The saliency fuser 780 also may generate an average shot saliency after scaling the frame saliency.

An insertion point ranker 795 receives the combined saliency from the saliency fuser 780 and generates a ranking of the insertion points in the set of insertion points. The new ranking is generated based on the saliency and the distance between insertion points, for example, as described using FIG. 6. In one or more embodiments, the insertion point ranker 795 may be combined with the isolation calculator 790 in a single computing unit or algorithm.

Referring to FIG. 8B, the media computing unit 1000 comprises a media processor 1025 which is configured to execute instructions to perform media processing on the media stream, which may be introduced into the media computing unit 1000 through the I/O unit 1005.

The media stream may be analyzed either sequentially or in parallel within the media processor 1025, which may be a single core or multi-core processor including multiple parallel processors.

In a media processor 1010, the media stream 1005 is processed, for example, divided into a plurality of shots. A first generator 1020 takes the processed media stream from the media processor 1010 and generates a first list of insertion points for introducing the secondary content is generated. An attractiveness metric calculator 1030 computes an attractiveness metric for the media stream at the insertion points in the first list from the first generator 1020. A discontinuity metric calculator 1040 computes the discontinuity metric for the media stream at the insertion points in the first list from the first generator 1020. The attractiveness metric calculator 1030 and the discontinuity metric calculator 1040 may be implemented in parallel processors in some embodiments. Next, a second generator 1050 generates a second list of insertion points using the output from the attractiveness metric calculator 1030 and the discontinuity metric calculator 1040. In various embodiments, the second generator 1050 arranges the insertion points in the second list to maximize a function of the attractiveness metric and the discontinuity metric.

Figure 9:
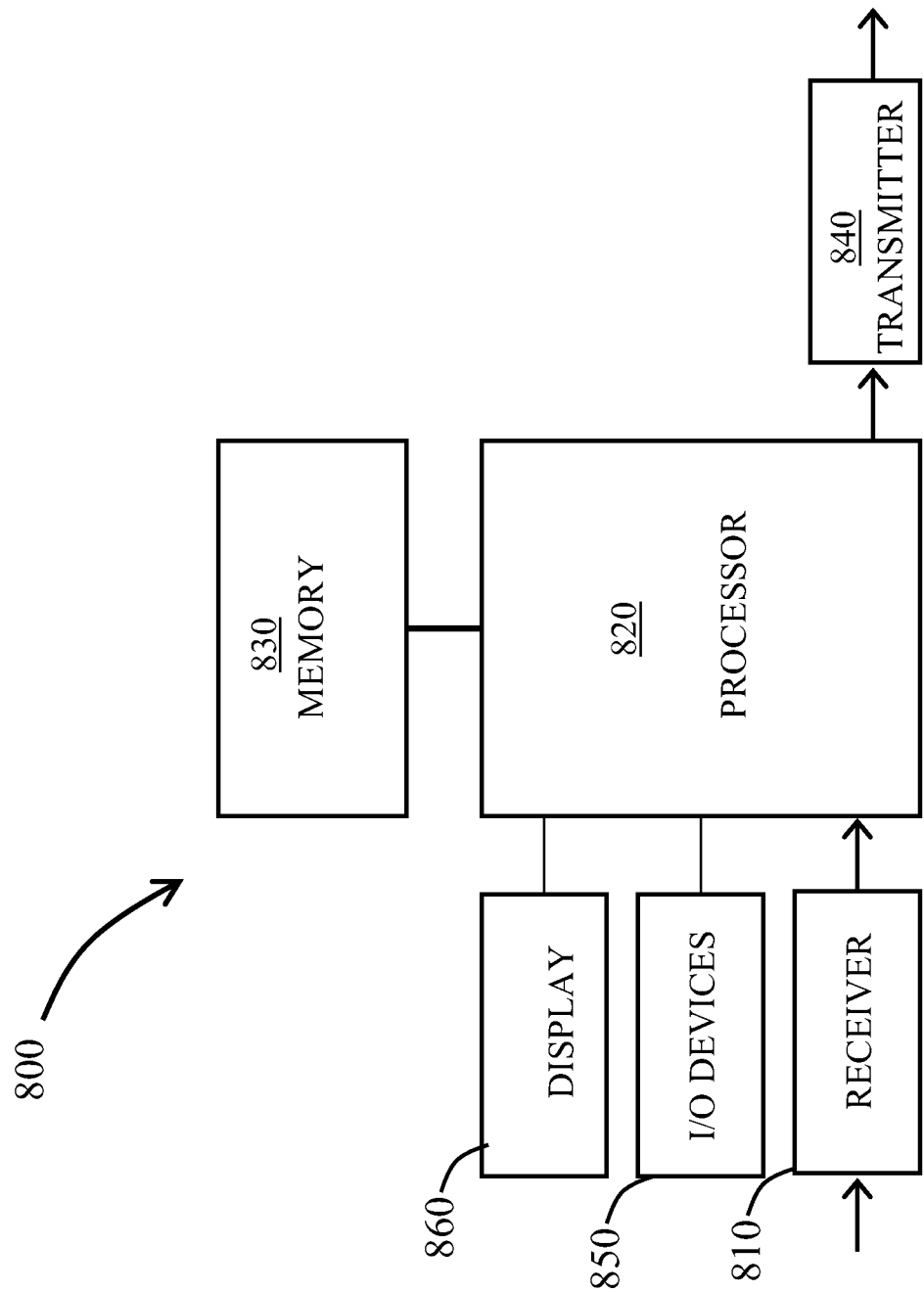
FIG. 9 illustrates a media computing unit in accordance with embodiments of the invention.

FIG. 9 illustrates a media computing unit in accordance with embodiments of the invention.

The media computer 800 includes a receiver 810, which may include a wireless antenna receiver and/or a wired network connection port for receiving the media content, for example, if it is stored at a remote location. The media computer 800 also includes a memory 830, which may include both a non-volatile memory and a volatile memory. In one embodiment, instructions for performing the operations as described in FIG. 2, FIG. 3, FIG. 4, and/or FIG. 6 may be stored in a non-transitory storage medium such as a magnetic storage medium or a solid state storage medium in the memory 830.

The media computer 800 may include further I/O devices 850 for inputting and outputting data. For example, the I/O devices 850 may include an optical disc such as a laser readable medium, for example, a compact disc reader, a blue ray disk reader, and/or digital video reader etc. In one or more embodiments, the instructions for performing the operations as described in FIG. 2, FIG. 3, FIG. 4, FIG. 6, and/or FIG. 7 may be stored in an optical disc, which is a non-transitory storage medium.

The media computer 800 may also include a display 860 and a transmitter 840 for transmitting the media if necessary. The transmitter 840 may include a plurality of wireless antennas and/or a wired port(s). The transmitter 840 and the receiver 810 can be combined together in some embodiments.

The media computer 800 includes a processor 820 configured to execute the instructions for performing the operations as described in FIG. 2, FIG. 3, FIG. 4, FIG. 6 and/or FIG. 7. The processor 820 may comprise a single processor or a plurality of processors.

In one embodiment, the processor 820 comprises a shot detector 710, a shot clusterizer 720, a scene transition analyzer 730, a motion analyzer 750, an audio saliency analyzer 755, a video saliency analyzer 760, a saliency tuner 770, a saliency fuser 780, an isolation calculator 790, and an insertion point ranker 795, e.g., as described in FIG. 8A.

In an alternative embodiment, the functions of a shot detector 710, a shot clusterizer 720, a scene transition analyzer 730, a motion analyzer 750, an audio saliency analyzer 755, a video saliency analyzer 760, a saliency tuner 770, a saliency fuser 780, an isolation calculator 790, and an insertion point ranker 795, e.g., as described in FIG. 8A may be performed within the same processor at different times. In other words, the processor 820 behaves as the shot detector 710, a shot clusterizer 720, a scene transition analyzer 730, a motion analyzer 750, an audio saliency analyzer 755, a video saliency analyzer 760, a saliency tuner 770, a saliency fuser 780, an isolation calculator 790, and an insertion point ranker 795, e.g., as described in FIG. 8A at various stages of the media processing.

In one embodiment, the functions of a shot detector 710, a shot clusterizer 720, a scene transition analyzer 730 may be performed in a first processor, whereas the functions of a motion analyzer 750, an audio saliency analyzer 755, a video saliency analyzer 760, a saliency tuner 770 may be a different second processor. The functions of a saliency fuser 780, an isolation calculator 790, and an insertion point ranker 795 may be performed in a third processor. The first and the second processor may be different processors, while the third processor may be a same or different processor than the first processor and/or the second processor.

In one embodiment, the processor 820 comprises the media processor 1010, the first generator 1020, the attractiveness metric calculator 1030, the discontinuity metric calculator 1040, and the second generator 1050, e.g., as described in FIG. 8B at various stages of the media processing.

In an alternative embodiment, the functions of the media processor 1010, the first generator 1020, the attractiveness metric calculator 1030, the discontinuity metric calculator 1040, and the second generator 1050, as described in FIG. 8 may be performed within the same processor at different times. In other words, the processor 820 behaves as the media processor 1010, the first generator 1020, the attractiveness metric calculator 1030, the discontinuity metric calculator 1040, and the second generator 1050, e.g., as described in FIG. 8B at various stages of the media processing.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for inserting secondary content into a media stream having primary content, the method comprising:
   at a processor, dividing the media stream comprising a plurality of frames into a plurality of shots;
   assigning visual concept labels to shots of the plurality of shots to produce a sequence of visual concept labels;
   grouping consecutive shots from the plurality of shots into a plurality of scenes, each scene comprising a cluster of interrelated shots in accordance with the sequence of visual concept labels;
   generating a first list of insertion points between the frames for introducing the secondary content, wherein the insertion points of the first list are boundaries between consecutive scenes in the plurality of scenes;
   generating an average insertion point saliency of the media stream at the insertion points of the first list;
   generating a second list of insertion points between the frames, wherein the insertion points are arranged in the second list to maximize a function of the average insertion point saliency and a distance in frames between each insertion point in the second list with other insertion points in the second list, and wherein the function is:

$$\sum_{I_j \in Ins} dist(I_i, I_j) \cdot X(I_i), \forall I_i \in Ins,$$

wherein $dist(I_i, I_j)$ is a metric for a distance between a first insertion point $I_i$ and a second insertion point $I_j$, wherein Ins is the first list of insertion points, and wherein $X(I_i)$ is the average insertion point saliency;
   wherein generating the average insertion point saliency of the media stream at the insertion points in the first list comprises selecting a first insertion point from the first list having a highest value of the function as the first insertion point of the second list; and
   inserting one or more other media streams into the media stream in accordance with an insertion point order in the second list.

2. The method of claim 1, further comprising:
   determining a distance between each possible insertion point with other insertion points in the first list.

3. The method of claim 1, wherein generating the average insertion point saliency of the media stream comprises:
   generating a video frame saliency for each frame within each shot of the plurality of the shots forming the boundaries between consecutive scenes in the plurality of scenes;
   generating an attention factor caused by camera motion; and
   scaling the video frame saliency with the attention factor to generate a visual frame saliency.

4. The method of claim 3, wherein generating the average insertion point saliency of the media stream further comprises:
   generating an audio frame saliency for each frame within each shot of the plurality of the shots forming the boundaries between consecutive scenes in the plurality of scenes.

5. The method of claim 4, wherein generating an average insertion point saliency of the media stream further comprises:
   generating an audio-video frame saliency by combining the audio frame saliency with the visual frame saliency;
   computing a shot saliency by averaging the combined audio-video frame saliency over all frames of each shot of the plurality of the shots forming the boundaries between consecutive scenes in the plurality of scenes; and
   computing the average insertion point saliency by averaging the shot saliency at the insertion point.

6. The method of claim 5, wherein combining the audio frame saliency with the visual frame saliency comprises:
   normalizing the audio frame saliency for each frame;
   normalizing the visual frame saliency for each frame; and
   linearly combining the normalized audio frame saliency and the normalized visual frame saliency.

7. The method of claim 1, wherein the distance between a first insertion point $I_i$ and a second insertion point $I_j$ is:

$$dist(I_i, I_j) = \exp[\lambda \cdot (d(I_i, I_j) - \overline{d})/L],$$

where $\overline{d}$ is an average number of frames between two nearby insertion points in an uniform sampling of insertion point pairs in the first list of insertion points, $d(I_i, I_j)$ represents a number of frames between the first and the second insertion points $I_i$ and $I_j$, L is a total number of frames in the media stream, and lamda $\lambda$ is a variance constant.

8. The method of claim 1, wherein generating the second list of insertion points further comprises:
   computing a second function, wherein the second function is a sum of the average insertion point saliency-weighted distance of the insertion point in the first list with other insertion points in the second list; and
   selecting a second insertion point from the first list having a highest rank of the second function as the second insertion point of the second list.

9. The method of claim 8, wherein the second function is:

$$\sum_{I_i \in SIns} dist(I_i, I_j) \cdot X(I_i), \forall I_i \in Ins, I_j \in SIns,$$

wherein $dist(I_i, I_j)$ is a metric for a distance between a first insertion point $I_i$ and a second insertion point $I_j$, wherein $X(I_i)$ is the average insertion point saliency, wherein Ins is the first list of insertion points, and wherein SIns is the second list of insertion points.

10. A method of introducing secondary content into a media stream, the method comprising:
    at a processor, dividing the media stream comprising a plurality of frames into a plurality of shots;
    assigning visual concept labels to shots of the plurality of shots to produce a sequence of visual concept labels;
    grouping consecutive shots from the plurality of shots into a plurality of scenes, each scene comprising a cluster of interrelated shots in accordance with the sequence of visual concept labels;
    generating a first list of insertion points between the frames for introducing the secondary content, wherein the insertion points of the first list are boundaries between consecutive scenes in the plurality of scenes;
    generating an insertion point saliency ($X(I_i)$) of the media stream at the insertion points of the first list;
    computing a distance in frames between insertion points for all insertion points from the first list;
    computing a first function for each insertion point in the first list, wherein the first function is a sum of an insertion point saliency-weighted distance of the insertion point in the first list with other insertion points in the first list, and wherein the first function is:

$$\sum_{I_j \in Ins} dist(I_i, I_j) \cdot X(I_i), \forall I_i \in Ins,$$

wherein $dist(I_i, I_j)$ is a metric for a distance between a first insertion point $I_i$ and a second insertion point $I_j$, and wherein Ins is the first list of insertion points;

selecting a first insertion point from the first list having a highest value of the first function as the first insertion point of a second list; and inserting one or more other media streams into the media stream in accordance with an insertion point order in the second list.

11. The method of claim 10, wherein generating an insertion point saliency ($X(I_i)$) of the media stream comprises computing an average between a first shot saliency of a last temporal shot in a first scene with a second shot saliency in a first temporal shot in a second scene, the first and the second scenes being consecutive scenes in the plurality of scenes.

12. The method of claim 10, wherein generating a second list of insertion points further comprises:

computing a second function, wherein the second function is a sum of an insertion point saliency-weighted distance of the insertion point in the first list with other insertion points in the second list; and selecting a second insertion point from the first list having a highest rank of the second function as the second insertion point of the second list, wherein the second function is:

$$\sum_{I_j \in SIns} dist(I_i, I_j) \cdot X(I_i), \forall I_i \in Ins, I_j \in SIns,$$

wherein $dist(I_i, I_j)$ is a metric for a distance between a first insertion point $I_i$ and a second insertion point $I_j$, wherein Ins is the first list of insertion points, and wherein SIns is the second list of insertion points.

13. The method of claim 10, wherein generating an insertion point saliency ($X(I_i)$) of the media stream comprises:

generating a video frame saliency for each frame within each shot of the plurality of the shots forming the boundaries between consecutive scenes in the plurality of scenes;

generating an attention factor caused by camera motion;

generating a visual frame saliency by scaling the video frame saliency with the attention factor;

generating an audio frame saliency for each frame within each shot of the plurality of the shots forming the boundaries between consecutive scenes in the plurality of scenes;

generating an audio-video frame saliency by combining the audio frame saliency with the visual frame saliency, wherein generating the audio-video frame saliency comprises:

normalizing the audio frame saliency for each frame, normalizing the visual frame saliency for each frame, and linearly combining the normalized audio frame saliency and the normalized visual frame saliency;

computing a shot saliency by averaging the combined audio-video frame saliency over all frames of each shot of the plurality of the shots forming the boundaries between consecutive scenes in the plurality of scenes; and computing the insertion point saliency at each insertion point by averaging the shot saliency of shots forming the insertion point.

14. A method for inserting secondary content into a media stream having primary content, the method comprising:

at a processor, dividing the media stream comprising a plurality of frames into a plurality of shots;

assigning visual concept labels to shots of the plurality of shots to produce a sequence of visual concept labels;

grouping consecutive shots from the plurality of shots into a plurality of scenes, each scene comprising a cluster of interrelated shots in accordance with the sequence of visual concept labels;

generating a first list of insertion points between the frames for introducing the secondary content, wherein the insertion points of the first list are boundaries between consecutive scenes in the plurality of scenes;

generating an average insertion point saliency of the media stream at the insertion point in the first list;

generating a second list of insertion points between the frames, wherein the insertion points are arranged in the second list to maximize a function of the average insertion point saliency and a distance in frames between each insertion point in the second list with other insertion points in the second list, and wherein the distance between a first insertion point $I_i$ and a second insertion point $I_j$ is:

$$dist(I_i, I_j) = \exp[\lambda \cdot (d(I_i, I_j) - \bar{d})/L],$$

where $\bar{d}$ is an average number of frames between two nearby insertion points in an uniform sampling of insertion point pairs in the first list of insertion points, $d(I_i, I_j)$ represents a number of frames between the first and the second insertion points $I_i$ and $I_j$, L is a total number of frames in the media stream, and lamda $\lambda$ is a variance constant;

wherein generating the average insertion point saliency of the media stream at the insertion point in the first list comprises selecting a first insertion point from the first list having a highest value of the function as the first insertion point of the second list; and inserting one or more other media streams into the media stream in accordance with an insertion point order in the second list.

15. The method of claim 14, wherein the function is weighted to favor insertion points having high discontinuity metric over insertion points having high attractiveness metric.

16. The method of claim 14, wherein the function is weighted to favor insertion points having high attractiveness metric over insertion points having high discontinuity metric.

17. The method of claim 14, wherein the insertion points of the first list are boundaries between consecutive events in the media stream.

18. A media processing unit comprising:

a shot detector configured to divide a media stream comprising a plurality of frames into a plurality of shots, the media stream having primary media content;

a scene transition analyzer configured to:

assign visual concept labels to shots of the plurality of shots to produce a sequence of visual concept labels;

group consecutive shots from the plurality of shots into a plurality of scenes, each scene comprising a cluster of interrelated shots in accordance with the sequence of visual concept labels; and generate a first list of insertion points between the frames for introducing secondary media content, wherein the insertion points of the first list are boundaries between consecutive scenes in the plurality of scenes; and an insertion point ranker configured to:
generate an insertion point saliency of the media stream at the insertion points of the first list;
generate a second list of insertion points between the frames, wherein the insertion points are arranged in the second list to maximize a function of the insertion point saliency and a distance in frames between each insertion point in the second list with other insertion points in the second list;
compute a distance between insertion points for all insertion points from the first list;
compute an insertion point saliency for each insertion point, which is an average of shot saliency of shots adjacent the insertion point;
compute a first function for each insertion point, wherein the first function is a sum of an average saliency-weighted distance of the insertion point in the first list with other insertion points in the first list;
select a first insertion point from the first list having a highest value of the first function as the first insertion point of the second list;
compute a second function, wherein the second function is a sum of an average saliency-weighted distance of the insertion point in the first list with other insertion points in the second list, wherein the first function is:

$$\sum_{I_j \in Ins} dist(I_i, I_j) \cdot X(I_i), \forall I_i \in Ins,$$

wherein $dist(I_i, I_j)$ is a metric for a distance between a first insertion point $I_i$ and a second insertion point $I_j$, wherein $X(I_i)$ is the insertion point saliency at an $i^{th}$ insertion point in the first list, and wherein Ins is the first list of insertion points, wherein the second function is:

$$\sum_{I_j \in SIns} dist(I_i, I_j) \cdot X(I_i), \forall I_i \in Ins, I_j \in SIns,$$

wherein $dist(I_i, I_j)$ is a metric for a distance between a first insertion point $I_i$ and a second insertion point $I_j$, wherein Ins is the first list of insertion points, and wherein SIns is the second list of insertion points; and select a second insertion point from the first list having a highest rank of the second function as the second insertion point of the second list, wherein the media processing unit is further configured to insert one or more other media streams into the media stream in accordance with an insertion point order in the second list.

19. The media processing unit of claim 18, further comprising:
a video saliency analyzer configured to generate a video frame saliency for each frame within each shot of the plurality of the shots forming the boundaries between consecutive scenes in the plurality of scenes;
a motion analyzer configured to generate an attention factor caused by camera motion;
a saliency tuner configured to scale the video frame saliency with the attention factor to generate a visual frame saliency; and
an audio saliency analyzer configured to generate an audio frame saliency for each frame within each shot of the plurality of the shots forming the boundaries between consecutive scenes in the plurality of scenes.

20. The media processing unit of claim 19, further comprising a saliency fuser configured to:
generate a video-audio frame saliency by combining the audio frame saliency with the visual frame saliency;
compute a shot saliency by averaging the video-audio frame saliency over all frames of each shot of the plurality of the shots forming the boundaries between consecutive scenes in the plurality of scenes; and
compute the insertion point saliency at each insertion point by averaging the shot saliency of shots forming the insertion point.

* * * * *